United States Patent
Umapathy et al.

(10) Patent No.: US 12,546,787 B2
(45) Date of Patent: Feb. 10, 2026

(54) NON-INVASIVE PAPER BASED DEVICE FOR PREGNANCY DETECTION IN CATTLE AND BUFFALOES

(71) Applicant: COUNCIL OF SCIENTIFIC & INDUSTRIAL RESEARCH, New Delhi (IN)

(72) Inventors: Govindhaswamy Umapathy, Hyderabad (IN); Amit Asthana, Hyderabad (IN); Mohan Rao Chintalagiri, Hyderabad (IN); Vinod Kumar, Hyderabad (IN); Suresh Gopi, Hyderabad (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 1138 days.

(21) Appl. No.: 17/436,602

(22) PCT Filed: Mar. 5, 2020

(86) PCT No.: PCT/IN2020/050202
§ 371 (c)(1),
(2) Date: Sep. 5, 2021

(87) PCT Pub. No.: WO2020/178857
PCT Pub. Date: Sep. 10, 2020

(65) Prior Publication Data
US 2022/0146525 A1    May 12, 2022

(30) Foreign Application Priority Data
Mar. 6, 2019 (IN) .............................. 201911008655

(51) Int. Cl.
*G01N 33/68* (2006.01)
*B01L 3/00* (2006.01)
(Continued)

(52) U.S. Cl.
CPC .......... *G01N 33/689* (2013.01); *B01L 3/5023* (2013.01); *G01N 1/34* (2013.01);
(Continued)

(58) Field of Classification Search
CPC .. G01N 33/689; G01N 33/581; B01L 3/5023; B01L 2300/0803; B01L 2400/0677; B01L 2300/126
See application file for complete search history.

(56) References Cited

U.S. PATENT DOCUMENTS 5,648,274 A * 7/1997 Chandler ......... G01N 33/54366
436/805
5,747,351 A * 5/1998 Hemmati .............. B01L 3/5055
435/7.1
(Continued)

FOREIGN PATENT DOCUMENTS

| WO | 2007117155 A1 | 10/2007 | |
| WO | WO-2017024297 A1 * | 2/2017 | ........ B01L 3/502707 |
| WO | WO-2017123668 A1 * | 7/2017 | ........... G01N 33/491 |

OTHER PUBLICATIONS

Umapathy, Govindhaswamy et al. "Detection of pregnancy and fertility status in big cats using an enzyme immunoassay based on 5α-pregnan-3α-ol-20-one." General and comparative endocrinology vol. 180 (2013): 33-8. doi:10.1016/j.ygcen.2012.10.009 (Year: 2013).*

(Continued)

*Primary Examiner* — Bao-Thuy L Nguyen
*Assistant Examiner* — Jim Atwell
(74) *Attorney, Agent, or Firm* — Blank Rome LLP

(57) ABSTRACT

The present invention discloses a kit and a novel method of extraction of a progesterone metabolite from feces/dung sample. The present invention also discloses a paper-based microfluidic device for detection of the progesterone metabolite for early determination of pregnancy in cattle and (Continued)

buffaloes. The invention further discloses antibodies developed against said metabolite, method of extraction, methods for fabricating the paper-based microfluidic devices and methods for inexpensive, rapid and non-invasive determination of pregnancy in early stages in cattle and buffaloes.

12 Claims, 7 Drawing Sheets

(51) Int. Cl.
    *G01N 1/34*     (2006.01)
    *G01N 33/58*     (2006.01)
(52) U.S. Cl.
    CPC .... *G01N 33/581* (2013.01); *B01L 2300/0803* (2013.01); *B01L 2300/126* (2013.01); *B01L 2400/0677* (2013.01)

(56) References Cited

U.S. PATENT DOCUMENTS

| | | | |
|---|---|---|---|
| 6,017,767 A * | 1/2000 | Chandler | B01L 3/5023 436/514 |
| 9,453,996 B2 * | 9/2016 | Delahunt | B01L 3/5023 |

OTHER PUBLICATIONS

Connelly, John T., Jason P. Rolland, and George M. Whitesides. "âPaper machineâ for molecular diagnostics." Analytical chemistry 87.15 (2015): 7595-7601. (Year: 2015).*
Verma, Mohit S., et al. "Sliding-strip microfluidic device enables ELISA on paper." Biosensors and Bioelectronics 99 (2018): 77-84. (Year: 2018).*
Evans, Elizabeth et al. âRational selection of substrates to improve color intensity and uniformity on microfluidic paper-based analytical devices.â The Analyst vol. 139,9 (2014): 2127-32. doi:10.1039/c4an00230j (Year: 2014).*
Search Report dated Nov. 6, 2020 in corresponding international application No. PCT/IN2020/050202.
Barone A et al. Gonadotrophin dose and timing of anaesthesia for laparoscopic artificial insemination in the puma (*Felis concolor*), J. Reprod. Fertil. 101 (1994) 103-108).
Kumar et al 2014 (General and Comparative Endocrinology, 201: 37-44.
Li, et al 2012 (Biomicrofluidics, 6, 0111301-13).
Martinez et al 2007 (Chem. Int. Ed., 46, 1318-1320).
Mithileshwari et al.2015 & 2014 [(Moschus chrysogaster). Theriogenology, Doi.:10.1016/j.theriogenology 2015.09.009].
Umapathy et al. 2015 (Chelonian conservation Biology 2015, 14:108-115).
Umapathy et al. 2013. Detection of pregnancy and fertility status in big cats using an enzyme immunoassay based on 5α-pregnan-3α-ol-20-one, General and Comparative Endocrinology, 180: 33-38, Nov. 8, 2012.
Ge et al. 2012. 3D Origami-based multifunction-integrated immunodevice: low-cost and multiplexed sandwich chemiluminescence immunoassay on microfluidic paper-based analytical device, Lab on a Chip, 12:3150-3158, Jul. 5, 2012.
Lisowski P and Zarzycki PK. 2013. Microfluidic Paper-Based Analytical Devices (μPADs) and Micro Total Analysis Systems (μTAS): Development, Applications and Future Trends, Chromatographia, 76(19-20):1201-1214 Feb. 22, 2013.
Peter et al. 2018. Opportunities and challenges associated with fecal progesterone metabolite analysis, Veterinary World, 11(10): 1466-1472, Oct. 20, 2018.
Schwarenmberger et al. 1996. Use of group-specific antibodies to detect fecal progesterone metabolites during the estrous cycle of cows, Theriogenology, 46(1):23-32 Jul. 1996.
Lu et al. 2010. Fabrication and Characterization of Paper-Based Microfluidics Prepared in Nitrocellulose Membrane by Wax Printing, Analytical Chemistry, 82(1):329-35 Jan. 1, 2010.
Sher et al. 2017. Paper-based analytical devices for clinical diagnosis: recent advances in the fabrication techniques and sensing mechanisms, Expert Reviews in Molecular Diagnostics, 17(4): 351-366 Apr. 2017.
Altundemir et al. 2017. A review on wax printed microfluidic paper-based devices for international health, Biomicrofluidics, 11(4): 041501 Aug. 30, 2017.

* cited by examiner

NON-INVASIVE PAPER BASED DEVICE FOR PREGNANCY DETECTION IN CATTLE AND BUFFALOES

CROSS REFERENCE TO RELATED APPLICATIONS

This application is a national phase of PCT application No. PCT/IN2020/050202, filed Mar. 5, 2020, which claims priority to IN patent application No. 201911008655, filed Mar. 6, 2019 which is incorporated herein by reference thereto.

FIELD OF THE INVENTION

The present invention relates a novel aqueous based extraction of progesterone metabolite from feces/dung sample for a non-invasive, simple, affordable and farmer friendly paper based kit for early detection of pregnancy in cattle and buffalos. In particular, the present invention relates to a paper based immunoassay kit which detects a progesterone metabolite 5α-pregnan-3α-ol-20-one in feces of the animals within 4 to 6 weeks of pregnancy. The kit consisting of aqueous extraction solution and paper based device are stable at room temperature and can be used by farmers without assistance or any technical expertise.

BACKGROUND OF THE INVENTION AND DESCRIPTION OF PRIOR ART

Livestock plays an important role in the economy of developing countries as a significant proportion of the population in developing and under-developed nations depend upon livestock for their livelihood. Milch animals such as cattle and buffaloes account for a large proportion of total livestock. It is estimated that the population of female cattle (cows) is 122.9 million and the population of female buffalo is 92.5 million (19$^{th}$ Livestock Census, 2012) in India. Further, about eight crore families in India are directly involved in dairy production, and almost 50 percent of milk production is from rural areas. Despite a huge number of cattle and buffalo population, the Indian livestock sector is poorly organized and unscientifically managed.

Timely detection of pregnancy in a milch animal, especially cattle and buffalo, is important to maximize milk production, shorten the calving interval by planning for breeding at the earliest estrus cycle. Due to lack of reproduction monitoring and management, the milk production per animal is extremely low, which leads to loss of income for marginal and small farmers. Further, in absence of scientific reproduction management, cattle and buffaloes suffer from several problems related to reproduction such as long calving intervals, anestrus (absence of periodic manifestation of estrus) and late puberty.

Traditionally in India, pregnancy is detected 3 to 4 months after conceiving using various techniques including palpation of the uterus, ultrasonography and measurement of hormones or biomarkers in blood and milk. These techniques require veterinary expertise and sophisticated laboratory infrastructure to conduct tests.

Though detection of biomarkers or hormones in milk is preferred over blood sampling, the same is not possible in case of livestock that has stopped giving milk and heifers (first-time pregnant animals). Further, repeated blood sampling is not advised or encouraged in animals due to stress caused by anesthesia (Barone, A et al. Gonadotrophin dose and timing of anaesthesia for laparoscopic artificial insemination in the puma (*Felis concolor*), J. Reprod. Fertil. 101 (1994) 103-108).

Further, most of the pregnancy test kits available in the western world are based on detection of progesterone in blood, milk, urine and in feces samples, but these kits can detect pregnancy after three months.

Reference may be made to Kumar et al 2014 (General and Comparative Endocrinology, 201: 37-44) which recites reproductive assessment of wild animals.

Reference may be made to Li, et al 2012 Biomicrofluidics, 6, 0111301-13) which recites current status and future trends in paper based microfluidics.

Reference may be made to Martinnez, et al 2007 (Chem. Int. Ed., 46, 1318-1320) which recites how the paper based device can be fabricated with printing.

Reference may be made to Mithileshwari et al 2015 & 2014 [(*Moschus chrysogaster*). *Theriogenology*, Doi.: 10.1016/j.theriogenology 2015.09.009] which recites fecal progesterone monitoring in Musk deer. The study was carried out for breeding program of wild animals as part of conservation efforts.

Reference may be made to Umapathy et al 2015 (*Chelonian conservation Biology* 2015, 14:108-115) which recites endocrine assessment of wild animals. The work estimated various hormones including progesterone, testosterone, and glucocorticoids to assess physiology reptiles in the forest habitats.

Reference may be made to Umapathy et al 2013 (General and Comparative Endocrinology, 180:33-38) which recites reproductive assessment of wild animals.

Therefore, there is a need to overcome the long standing problems in the prior art by providing an inexpensive and non-invasive device for early detection of pregnancy in cattle and buffaloes.

OBJECTIVES OF THE INVENTION

An objective of the present invention is to provide a non-invasive, simple, and affordable kit for early detection of pregnancy in cattle and buffalos using dung samples.

Another object of the present invention is to provide a complete kit containing extraction solution and device which can be operated by unskilled technicians for early detection of pregnancy in cattle and buffaloes.

SUMMARY OF THE INVENTION

An aspect of the present invention provides a microfluidic device comprising: at least one patterned, porous and hydrophilic layer patterned with wax outlining patterns to create hydrophobic barriers, at least one application zone for receiving a biological sample and a reagent; and optionally, at least one microfluidic channel for delivery of the biological sample and the reagent to a reaction zone, wherein said device is configured for detecting 5α-pregnan-3α-ol-20-one antigen at a concentration greater than 400 nanograms per gram in the biological sample.

Another aspect of the present invention provides a microfluidic device, wherein said device is a single-layer paper device (100) having three circular zones configured to receive a biological sample and a reagent, comprising:
   a. a test zone (101) comprising immobilized 5α-pregnan-3α-ol-20-one antigen for colorimetric detection of 5α-pregnan-3α-ol-20-one;

b. a positive control zone (102) comprising immobilized 5α-pregnan-3α-ol-20-one antigen for colorimetric detection of 5α-pregnan-3α-ol-20-one;

c. a negative control zone (103); and d. a wax pattern (104) on the paper layer, wherein the wax pattern outlines the test zone, the positive control zone and the negative control zone to create a hydrophobic barrier.

Yet another aspect of the present invention provides a microfluidic device, wherein said device is a multi-layer device (200) comprising:

a. a first layer (300) configured for receiving a biological sample and reagents;

b. a second layer (400) configured for delivery of the biological sample and the reagents to a reaction zone;

c. a third layer (500) configured for delivery of the biological sample to the reaction zone; and d. a fourth layer (600) configured for colorimetric detection of 5α-pregnan-3α-ol-20-one.

Still another aspect of the present invention provides a microfluidic device, wherein the first layer (300) of the multilayer device (200) comprises:

a. a sample port (301) for receiving the biological sample; and b. a reagent port (302) for receiving the reagents.

Another aspect of the present invention provides a microfluidic device, wherein the second layer (400) of the multilayer device (200) comprises:

a. a first circular zone (401) for delivery of biological sample from a sample port (301) to a circular zone (501) for delivery to an antibody-enzyme complex storage zone (502);

b. a second circular zone (402) for delivery of reagents from a reagent port (302) to the antibody-enzyme complex storage zone (502);

c. a third circular zone (403) for delivery of reagents from the reagent port (302) to a circular zone (503) for delivery to a positive control zone (602);

d. a fourth circular zone (404) for delivery of reagents from the reagent port (302) to a circular zone (504) for delivery to a negative control zone (603);

e. an inverted y-shaped microfluidic channel (405) for delivery of reagents from the reagent port (302) to the reaction zones in the fourth layer (600).

Yet another aspect of the present invention provides a microfluidic device, wherein the third layer (500) of the multilayer device (200) comprises:

a. a first circular zone (501) for delivery of the biological sample from a first circular zone (401) to an antibody-enzyme complex storage zone (502);

b. an antibody-enzyme complex storage zone (502);

c. a second circular zone (503) for delivery of reagents from the third circular zone (403) to a positive control zone (602); and d. a third circular zone (504) for delivery of reagents from the fourth circular zone (404) to a negative control zone (603).

Still another aspect of the present invention provides a microfluidic device, wherein the fourth layer (600) of the multilayer device (200) comprises:

a. a test zone (601) comprising immobilized 5α-pregnan-3α-ol-20-one antigen for colorimetric detection of 5α-pregnan-3α-ol-20-one;

b. a positive control zone (602) comprising immobilized 5α-pregnan-3α-ol-20-one antigen for generating a positive control signal confirming the transfer of at least part of reagent from the sample port (301) to the test zone (601); and c. a negative control zone (603), for generating a negative control confirming the transfer of at least part of reagent from the sample port (301) to the test zone (601).

Another aspect of the present invention provides a microfluidic device, wherein the layer has a thickness of less than 220 μm and particle retention of more than 10 μm.

Yet another aspect of the present invention provides a method for colorimetric detection of 5α-pregnan-3α-ol-20-one in a biological sample using the microfluidic device, said method comprising the steps of:

a. adding the biological sample to a test zone (101);

b. adding an antibody-enzyme complex solution to the test zone (101), a positive control zone (102) and a negative control zone (103);

c. adding a wash buffer to the test zone (101), the positive control zone (102) and the negative control zone (103);

d. adding TMB substrate to the test zone (101), the positive control zone (102) and the negative control zone (103); and e. detecting the color of the test zone (101), the positive control zone (102) and the negative control zone (103), wherein appearance of faint color or no color in the test zone confirms the presence of 5α-pregnan-3α-ol-20-one in the biological sample.

Still another aspect of the present invention provides a method for colorimetric detection of 5α-pregnan-3α-ol-20-one in a biological sample using the device, said method comprising the steps of:

a. adding a biological sample to a sample port (301);

b. adding a wash buffer to a reagent port (302);

c. adding TMB substrate to the reagent port (302); and d. detecting the color of a test zone (601), a positive control zone (602) and a negative control zone (603), wherein appearance of faint color or no color in the test zone confirms the presence of 5α-pregnan-3α-ol-20-one in the biological sample.

Another aspect of the present invention provides a method for obtaining a biological sample comprising the steps of:

a. mixing dung with 2-hydroxypropyl cyclodextrin followed by shaking for 3 minutes;

b. allowing debris and other particles to settle to obtain a clear supernant, wherein the supernant comprising 5α-pregnan-3α-ol-20-one is the biological sample.

Yet another aspect of the present invention provides a kit for early detection of pregnancy in cattle and buffalo comprising:

I. a microfluidic device;

II. at least three reagents;

III. a vial; and

IV. an instruction manual.

BRIEF DESCRIPTION OF THE ACCOMPANYING DRAWINGS

DETAILED DESCRIPTION OF THE INVENTION

Figure 1:
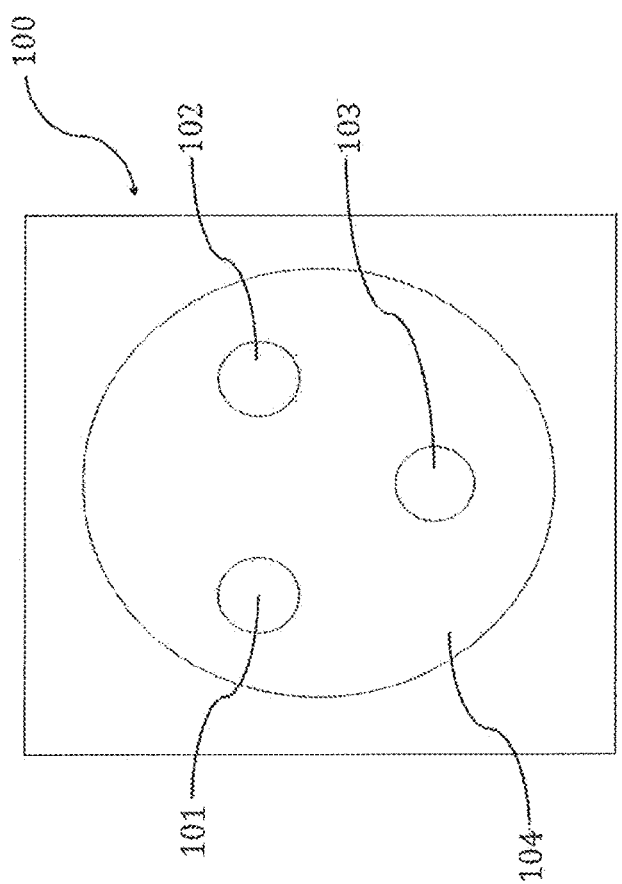
FIG. 1 is a graphical representation of a single layer device in accordance with an embodiment of the invention.

Unless defined otherwise, all technical and scientific terms used herein have the same meaning as commonly understood by one of ordinary skill in the art to which the methods belong. Although any methods and compositions similar or equivalent to those described herein can also be used in the practice or testing of the methods and compositions, representative illustrative methods and compositions are now described.

Where a range of values is provided, it is understood that each intervening value between the upper and lower limit of that range and any other stated or intervening value in that stated range, is encompassed within the methods and compositions. The upper and lower limits of these smaller ranges may independently be included in the smaller ranges and are also encompassed within by the methods and compositions, subject to any specifically excluded limit in the stated range. Where the stated range includes one or both of the limits, ranges excluding either or both of those included limits are also included in the methods and compositions.

It is appreciated that certain features of the methods, which are, for clarity, described in the context of separate embodiments, may also be provided in combination in a single embodiment. Conversely, various features of the methods and compositions, which are, for brevity, described in the context of a single embodiment, may also be provided separately or in any suitable sub-combination.

It is noted that, as used herein and in the appended claims, the singular forms "a", "an", and "the" include plural referents unless the context clearly dictates otherwise. As such, this statement is intended to serve as antecedent basis for use of such exclusive terminology as "solely," "only" and the like in connection with the recitation of claim elements or use of a "negative" limitation.

As will be apparent to those of skill in the art upon reading this disclosure, each of the individual embodiments described and illustrated herein has discrete components and features which may be readily separated from or combined with the features of any of the other embodiments without departing from the scope or spirit of the present methods. Any recited method can be carried out in the order of events recited or in any other order that is logically possible.

The term "patterned" or "pattern" refers to the hydrophobic barriers created on the substrate, which is paper in the present invention. The patterns provide spatial control of biological fluids and reagents. Further, it enables fluid transport due to capillary action within the regions the barriers define.

The term "porous" is to be understood as a structure in the medium or a material, which has a porosity that enables liquid transport by capillary suction. For example, the structure may be formed by an inherently micro-structured medium, e.g. a paper-like material. Further, the structure may be a micromachined micro-structured structure, e.g. a micromachined surface structure. Such porous materials are known from conventional lateral flow assays and diagnostic kits.

The term "hydrophilic" as used herein refers to any material that has a strong affinity or preference for the biological samples and the reagents. Due to the affinity, the medium enables liquid transport by capillary action.

The term "hydrophobic" as used herein refers to any material that has a lack of affinity or aversion for the biological samples and the reagents. Due to the lack of affinity, the medium does not enable liquid transport by capillary action.

The term "microfluidic channel" refers to a pathway for a fluid having the width in the range of 0.5 mm to 1.5 mm.

The term "reagents" as used herein refers to the reagents or chemicals used in the operation of the paper devices, as described herein. The reagents include, but are not limited to, antibody-enzyme complex, wash buffer and TMB substrate.

The term "biological sample" or "fluid sample" as used herein refers to the supernatant after the fecal extract has been processed for extraction of antigen.

The term "configured" as used herein refers to the arrangement for a specified purpose which directly or indirectly influences the determination of pregnancy of cattle or buffaloes using the described devices.

The term "antigen" or "5α antigen" or "biomarker" as used herein refers to 5α-pregnan-3α-ol-20-one metabolite used for detection of pregnancy in cattle and buffaloes.

The term "positive control" refers to a treatment with a known reaction so that this positive response can be compared to the unknown response of the treatment.

The term "negative control" refers to a treatment in which no response is expected.

The term "reaction zone" refers to the hydrophilic region of the device wherein one or more steps of the competitive direct ELISA is performed.

The term "visualization" comprises determination and comparison of the color of the test zone with the positive control and the negative control zone of the devices described herein. If color appears in both test zone and positive control zone, then the determination is that the sample is from a non-pregnant animal. While, if color appears in positive control zone but not in test zone, then the determination is that the sample is from a pregnant animal.

The term "antibody-enzyme complex" as used herein refers to antibodies against 5α-pregnan-3α-ol-20-one conjugated or labelled or tagged with horseradish peroxide enzyme.

The term "wash buffer" refers to a buffer used for washing excess unbound antibody-enzyme complex. Any suitable wash buffer known in the prior art may be used.

In reference to the present invention, the term 'fecal sample' and 'dung sample' can be used interchangeably.

The present invention is based on indirect competitive immunoassay. The present invention is directed towards a microfluidic device for early detection of pregnancy, which detects higher values of 5α-pregnan-3α-ol-20-one in cows and buffaloes from their dung sample.

An embodiment of the present invention provides a microfluidic device comprising:
a. at least one patterned, porous and hydrophilic layer patterned with wax outlining patterns to create hydrophobic barriers;
b. at least one application zone for receiving a biological sample and a reagent; and
c. optionally, at least one microfluidic channel for delivery of the biological sample and the reagent to a reaction zone, wherein said device is configured for detecting 5α-pregnan-3α-ol-20-one antigen at a concentration greater than 400 nanograms per gram in the biological sample.

In another embodiment of the present invention, there is provided a microfluidic device, wherein said device is a single-layer paper device (100) having three circular zones configured to receive a biological sample and a reagent, comprising:
a. a test zone (101) comprising immobilized 5α-pregnan-3α-ol-20-one antigen for colorimetric detection of 5α-pregnan-3α-ol-20-one;
b. a positive control zone (102) comprising immobilized 5α-pregnan-3α-ol-20-one antigen for colorimetric detection of 5α-pregnan-3α-ol-20-one;
c. a negative control zone (103); and
d. a wax pattern (104) on the paper layer, wherein the wax pattern outlines the test zone, the positive control zone and the negative control zone to create a hydrophobic barrier.

In yet another embodiment of the present invention, there is provided a microfluidic device, wherein said device is a multi-layer device (200) comprising:
a. a first layer (300) configured for receiving a biological sample and reagents;
b. a second layer (400) configured for delivery of the biological sample and the reagents to a reaction zone;
c. a third layer (500) configured for delivery of the biological sample to the reaction zone; and
d. a fourth layer (600) configured for colorimetric detection of 5α-pregnan-3α-ol-20-one.

In still another embodiment of the present invention, there is provided a microfluidic device, wherein the first layer (300) of the multilayer device (200) comprises:
a. a sample port (301) for receiving the biological sample; and
b. a reagent port (302) for receiving the reagents.

In another embodiment of the present invention, there is provided a microfluidic device, wherein the second layer (400) of the multilayer device (200) comprises:
a. a first circular zone (401) for delivery of the biological sample from a sample port (301) to a circular zone (501) for delivery to an antibody-enzyme complex storage zone (502);
b. a second circular zone (402) for delivery of reagents from a reagent port (302) to the antibody-enzyme complex storage zone (502);
c. a third circular zone (403) for delivery of reagents from the reagent port (302) to a circular zone (503) for delivery to a positive control zone (602);
d. a fourth circular zone (404) for delivery of reagents from the reagent port (302) to a circular zone (504) for delivery to a negative control zone (603);
e. an inverted y-shaped microfluidic channel (405) for delivery of reagents from the reagent port (302) to the reaction zones in the fourth layer (600).

In yet another embodiment of the present invention, there is provided a microfluidic device, wherein the third layer (500) of the multilayer device (200) comprises:
a. a first circular zone (501) for delivery of the biological sample from a first circular zone (401) to an antibody-enzyme complex storage zone (502);
b. an antibody-enzyme complex storage zone (502);
c. a second circular zone (503) for delivery of reagents from the third circular zone (403) to a positive control zone (602); and
d. a third circular zone (504) for delivery of reagents from the fourth circular zone (404) to a negative control zone (603).

In still another embodiment of the present invention, there is provided a microfluidic device, wherein the fourth layer (600) of the multilayer device (200) comprises:
a. a test zone (601) comprising immobilized 5α-pregnan-3α-ol-20-one antigen for colorimetric detection of 5α-pregnan-3α-ol-20-one;
b. a positive control zone (602) comprising immobilized 5α-pregnan-3α-ol-20-one antigen for generating a positive control signal confirming the transfer of at least part of reagent from the sample port (301) to the test zone (601); and
c. a negative control zone (603), for generating a negative control confirming the transfer of at least part of reagent from the sample port (301) to the test zone (601).

In another embodiment of the present invention, there is provided a microfluidic device, wherein the patterned, porous and hydrophilic layer has a thickness of less than 220 μm and particle retention of more than 10 μm.

In yet another embodiment of the present invention, there is provided a microfluidic device, wherein the patterned, porous and hydrophilic layer has a thickness in the range from 205 μm to 220 μm.

For the multilayer fluidic device, the total thickness of the hydrophilic layer is in the range from (205×4) μm to (220×4) μm.

In still another embodiment of the present invention, there is provided a microfluidic device, wherein the patterned, porous and hydrophilic layer has a particle retention in the range of 10 μm to 25 μm.

In another embodiment of the present invention, there is provided a microfluidic device, wherein the biological sample is obtained from dung of cattle or buffalo.

Another embodiment of the present invention provides a method for colorimetric detection of 5α-pregnan-3α-ol-20-one in a biological sample using the microfluidic device, said method comprising the steps of:
a. adding the biological sample to a test zone (101);
b. adding an antibody-enzyme complex solution to the test zone (101), a positive control zone (102) and a negative control zone (103);
c. adding a wash buffer to the test zone (101), the positive control zone (102) and the negative control zone (103);
d. adding TMB substrate to the test zone (101), the positive control zone (102) and the negative control zone (103); and
e. detecting the color of the test zone (101), the positive control zone (102) and the negative control zone (103) wherein appearance of faint color or no color in the test zone confirms the presence of 5α-pregnan-3α-ol-20-one in the biological sample.

In another embodiment of the present invention, there is provided a method for colorimetric detection of 5α-pregnan- 3α-ol-20-one in a biological sample using the device, said method comprising the steps of:
a. adding a biological sample to a sample port (301);
b. adding a wash buffer to a reagent port (302);
c. adding TMB substrate to the reagent port (302); and
d. detecting the color of a test zone (601), a positive control zone (602) and a negative control zone (603) wherein appearance of faint color or no color in the test zone confirms the presence of 5α-pregnan-3α-ol-20-one in the biological sample.

In still another embodiment of the present invention, there is provided a method for colorimetric detection of 5α-pregnan-3α-ol-20-one in a biological sample using the device, wherein the biological sample is obtained from dung of cattle or buffalo.

Yet another embodiment of the present invention provides a method for obtaining a biological sample comprising the steps of:
i. mixing dung with 2-hydroxypropyl cyclodextrin followed by shaking for 3 minutes;
ii. allowing debris and other particles to settle to obtain a clear supernant, wherein the supernant comprising 5α-pregnan-3α-ol-20-one is the biological sample.

Another embodiment of the present invention provides a kit for early detection of pregnancy in cattle and buffalo comprising:
I. a microfluidic device,
II. at least three reagents;
III. a vial; and
IV. an instruction manual.

In yet another embodiment of the present invention, there is provided a kit for early detection of pregnancy in cattle and buffalo, wherein the reagents are a wash buffer, TMB substrate and 2-hydroxypropyl cyclodextrin.

In still another embodiment of the present invention, there is provided a kit for early detection of pregnancy in cattle and buffalo, wherein the reagent further comprises an antibody-enzyme complex solution.

The present invention provides a process for aqueous extraction of metabolite (5α-pregnan-3α-ol-20-one) present in fecal samples of cattle and buffaloes, which is an easily extractable potential biomarker for early detection of pregnancy in cattle and buffaloes. 5α-pregnan-3α-ol-20-one has been used for the first time for early detection of pregnancy after extraction from fecal sample of cattle and buffaloes using an aqueous solution. The method of extracting the metabolite from the fecal sample is also novel compared to the methods reported in the art. The developed non-invasive paper-microfluidic device-based kit can detect pregnancy in cattle and buffaloes at as early as 4-6 weeks with a high accuracy rate.

The present invention uses antibodies developed against 5α-pregnan-3α-ol-20-one, methods for fabricating the paper-based microfluidic device and an inexpensive, rapid and non-invasive method for determination of pregnancy in early stages in cattle and buffaloes.

For the first time, the inventors of the present application have identified a metabolite (5α-pregnan-3α-ol-20-one, hereinafter referred to as 5α antigen) present in fecal samples of pregnant cattle and buffaloes. Further, antibodies against this progesterone metabolite (5α antigen) were raised, an enzyme immunoassay (EIA) was standardized and the quantities of 5α antigen in the fecal samples was measured for a wide range of livestock and wild animals. Based on the measurements the threshold value (which indicates pregnancy in cattle and buffaloes) was identified and used for development of an extraction method and paper-based microfluidic devices.

The present invention represents technical advancement over the existing methods for early determination of pregnancy in cattle and buffaloes. The advances are characterized by the following features:
(a) Affordable: The device/developed is highly inexpensive and can be afforded even by small-scale farmers or breeders in rural areas.
(b) Sensitive and Specific: The device developed is highly sensitive and very specific to a particular antigen (5α-pregnan-3α-ol-20-one). No instance of false positive or false negative was observed. The specific antibody developed for this assay is 100% accurate in ELISA format. The accuracy of same antibody in the paper-based device format is 78-92%.
(c) User friendly: The device developed represents point-of-care solution for determining early pregnancy in cattle and buffalo. It can be used even by marginal and small farmers. The instructions for operating are simple to perform and require minimal to no training.
(d) Rapid and Robust: The test results can be immediately ascertained. Further, the device does not require any special storage equipment.
(e) Equipment Free: The device does not require any sophisticated instrument for operation.
(f) Delivery to those who need it: The device is easy to transport and use. Hence, the device can be easily delivered to rural areas where there is a high requirement of the same.

The inventive approach used in the present invention has led to development of devices/kits which would help the small and marginal farmers across the world.

Before the devices, kits and methods of the present disclosure are described in greater detail, it is to be understood that the invention is not limited to particular embodiments and may vary. It is also to be understood that the terminology used herein is for the purpose of describing particular embodiments only, and is not intended to be limiting, since the scope of the devices, kits and compositions will be limited only by the appended claims.

Paper-Based Devices

In an embodiment of the present invention, porous, hydrophilic substrates are patterned with hydrophobic barriers to provide low-cost, portable, and technically simple platforms for performing immunoassays on biological liquids. One example of such useful hydrophilic substrate for assays is paper, which is inexpensive, readily commercially available, disposable, wicks liquids quickly, and does not need careful handling.

The paper or any other porous, hydrophilic substrate is patterned with hydrophobic barriers that provide spatial control of biological fluids and enable fluid transport due to capillary action within the regions the barriers define. The hydrophobic barriers can be made by any suitable material such as, but not limited to, wax which provides a substantially impermeable barrier throughout the thickness of the porous, hydrophilic substrate within defined areas.

Appropriate antigens are immobilized on paper substrates and the papers can be biofunctionalized to prepare the device. Further, the patterns can be printed on a single paper and then appropriately folded into origami-like pattern to prepare the device. Alternatively, each paper can be individually printed and then deposed over the other to prepare the device.

Paper Used for Microfluidic Device

The microfluidic device can be prepared using a suitable material. In an embodiment of the present invention, the material used is a filter paper, such as Whatmann® filter paper 4 with a thickness of 0.210 mm and particle retention of 20-25 micrometers. A non-exhaustive representative examples of other suitable filter papers which can be used in the present invention are provided in Table 1.

Figure 3:
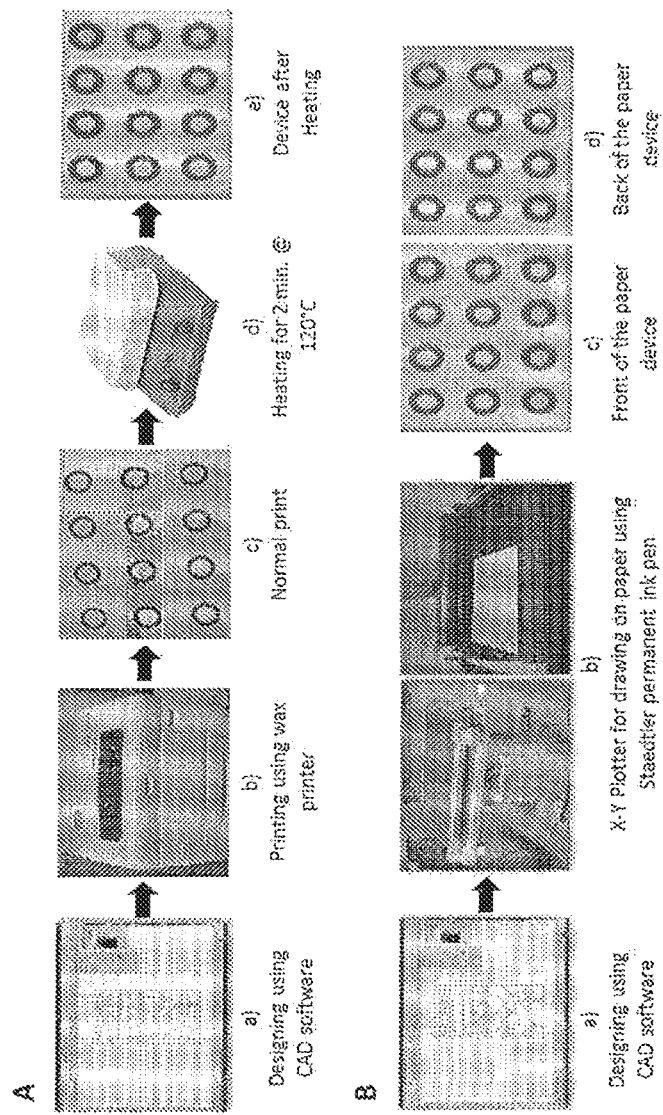
FIG. 3 is a schematic flowchart depicting the process for fabricating the paper-based microfluidic devices.

FIG. 3 provides a schematic flowchart for showing the fabrication process of the device.

Biofunctionalization and Immobilization of Antigens

An embodiment of the present invention provides a method for biofunctionalization of paper substrate.

The present invention also discloses the biofunctionalization of layers of the device, wherein the reaction zones are treated with 0.5% low molecular weight chitosan solution.

TABLE 1

| Type of the Paper | Actual use of paper | Source | Particle Retention Liquid (μm) | Filtration Speed (Aprox.) Hergberg (s) per 1000 litre | Typical thickness (mm) |
| --- | --- | --- | --- | --- | --- |
| NO. 5A | Quantitave Filter Paper Ashless | Advantec (Cole-Parmer) | >10 | 60 sec | 0.22 |
| Grade 1 | Qualitative Filter Paper | Whatman (GE-Wipro) | 11 | 150 sec | 0.18 |
| Grade 4 | Qualitative Filter Paper | Whatman (GE-Wipro) | 20-25 | 37 sec | 0.21 |
| 91 | Wet strengthed Qualitative | Whatman (GE-Wipro) | 10 | NA | 0.205 |
| 93 | Wet strengthed Qualitative | Whatman (GE-Wipro) | 10 | NA | 0.145 |
| 114 | Wet strengthed Qualitative | Whatman (GE-Wipro) | 25 | 38 sec | 0.19 |
| 41 | Ashless Quantitative | Whatman (GE-Wipro) | 20-25 | 54 sec | 0.22 |
| 54 | Quantitative Hardened low Ash | Whatman (GE-Wipro) | 20-25 | 39 sec | 0.185 |
| 541 | Quantitative Hardened Ashless | Whatman (GE-Wipro) | 20-25 | 34 sec | 0.155 |

In yet another embodiment of the present invention, any paper having particle retention of more than 10 μm and thickness less than 220 μm can be used for the purpose of preparing the device of present invention.

Fabrication of Paper-Based Devices

The paper-based device designs are made using computer-aided design software. In still another embodiment of the present invention, CorelDRAW® (developed and marketed by Corel Corporation) is used for designing the single layer device.

In another embodiment of the present invention, the design is printed on Whatmann® filter paper grade-4 (manufactured by GE Healthcare) using the solid ink wax printer (Xerox ColorQube 8570N).

In still another embodiment of the present invention, the device design is represented in FIG. 1. The design was printed on a 2.5 cm by 2.5 cm squared paper (100). Three reaction zones were created, each having a diameter of 4 mm. The three reaction zones are, a test zone (101), a positive control zone (102) and a negative control zone (103). Except for the reaction zones, the entire surface of the device is layered by a hydrophobic material, preferably wax.

Figure 2:
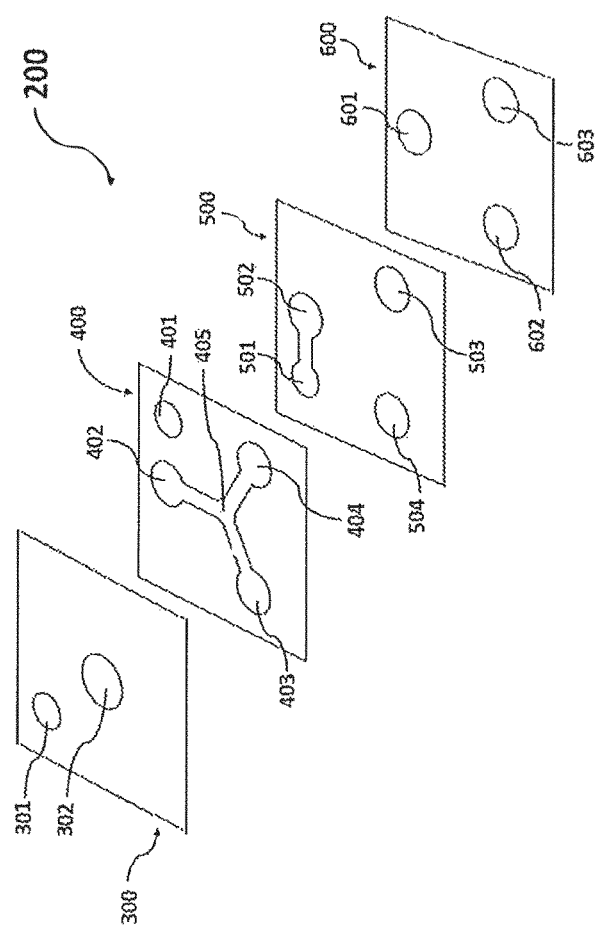
FIG. 2 is a graphical representation of a multi-layer device in accordance with an embodiment of the invention.

In yet another embodiment of the present invention, the device design is represented in FIG. 2. The design was printed on a 10 cm by 2.5 cm squared paper (200) and it was folded into four squared pieces of 2.5 cm by 2.5 cm each, which represents one layer of the paper-based device.

In another embodiment of the present invention, the reaction zones are hydrophilic, which allows for reaction between the reagents and the sample.

In yet another embodiment of the present invention, the patterned paper substrate is heated by placing the substrate on a hotplate with the waxed side up at a temperature of 120° C. for one minute and cooled to room temperature. This allows the wax material to melt and percolate vertically (down) to the other side of the paper. Further, melted wax also wicks in the horizontal axis of the paper creating a broader line of the paper, so as to form a hydrophobic boundary that defines the dimensions of the reaction zones.

In still another embodiment of the present invention, the fabrication of paper-based devices is done in a single step method where CAD design is drawn on Whatmann® paper.

The devices are either dipped in a chitosan bath or 3 μl chitosan is added to the reaction zones. Once the reaction zones are semi-dried (approximately after 5 min), the reaction zones are treated with 0.5% glutaraldehyde solution, either by dipping in a glutaraldehyde bath or adding 3 μl glutaraldehyde to the reaction zones. The device is then dried at room temperature for approximately one hour.

In still another embodiment of the present invention, immobilization of 5α-pregnan-3α-ol-20-one (5α antigen) is done using chitosan and polyethyleneimine (PEI) coated papers.

In yet another embodiment of the present invention, 5α antigen conjugated with BSA is immobilized on the paper devices.

In another embodiment of the present invention, the blocking step during immobilization is performed with a blocking buffer.

Extraction of 5α Antigen from Fecal Sample

The inventors of the present application have identified one of the major progesterone metabolites, 5α-pregnan-3α-ol-20-one (5α antigen), in fecal sample of cattle and buffaloes. Thereafter, antibodies were raised against the already characterized 5α antigen.

The inventors of the present application have identified that the concentration of antigen for pregnant animals in fecal samples is 0.5 to 2 folds greater than that of non-pregnant animals. The devices developed for early detection of pregnancy is based on the immobilization of the threshold concentration of the antigen.

Another embodiment of the present invention provides a method for extraction of 5α antigen from fecal samples of cattle and buffalo. 2-Hydroxypropyl)-β-cyclodextrin (2HPβCD) is used to extract the antigen from the fecal sample.

In yet another embodiment of the present invention, for extraction of 5α antigen, the fecal sample is taken in a vial and 2HPβCD solution is added. The vial is moderately shaken for two minutes and allowed to stand until a clear supernatant is visible. This supernatant can be used as a biological sample for early detection of pregnancy.

In still another embodiment of the present invention, the 5α antigen, which determines the pregnancy of the cattle is extracted from the fecal samples using a novel approach. For extracting the threshold level of antigen, 10 mM (2-Hydroxypropyl)-β-cyclodextrin (2HPβCD) is used.

In yet another embodiment of the present invention, a one-step process involving only one reagent is used for extraction of 5α antigen. For extracting the antigen, 0.2 g of fecal sample is taken in a vial and 3 ml of 10 mM 2HPβCD solution is added. The vial is moderately shaken for 2 minutes and allowed to stand until a clear supernatant is visible. The supernatant contains the threshold amount of 5α antigen which can be used as a biological sample for early detection of pregnancy in cattle and buffaloes.

Immunoassays Performed with the Antigen

In another embodiment of the present invention, antibodies are developed against the 5α-pregnan-3α-ol-20-one antigen, which is used to perform the direct dot-blot immune assay. In the assay, the antigen is immobilized on bioactivated paper with the subsequent addition of specific antibodies tagged with horseradish peroxide to form the antibody-enzyme complex. In this method, the presence of 5α antigen at varying concentration is detected by color gradient scale. Several strategies are explored for the detection system which includes HRP based change of color of TMB-Ultra sensitive. Apart from TMB, gold nanoparticles (GNP) (size range 20-40 nm) conjugated with antibodies through EDC/NHS chemistry are also employed. The specific binding of bio-conjugated GNP to the target metabolite leads to the aggregation of GNP with subsequent emission of the higher wavelength of light. This phenomenon is detected by the naked eye in color gradient manner, which also confirms pregnancy in cattle using the color coding meter/marker.

In yet another embodiment of the present invention, based on sandwich ELISA, early detection of pregnancy in animals is confirmed by immobilizing the capture antibody on to the bio-activated paper and the sample is allowed to run through the detection zones along with detection antibody, which is either conjugated with enzyme HRP or GNPs.

In another embodiment of the present invention, specific progesterone metabolite 5α antigen isolated from the dung samples of cattle and antibodies developed against this antigen were used to perform competitive direct immunoassay. In the assay, the standard antigen conjugated with BSA was immobilized on bio-activated paper. In normal case, when there is no antigen present in the sample, then with subsequent addition of specific antibodies tagged with HRP followed by substrate, a color change from white to blue can be observed. If the sample contains the 5α antigen at different concentration, then competition between antigen present in the sample and immobilized on the biofunctionalized paper takes place for the antibody-HRP complex or AEC. This competition leads to a color gradient.

Figure 4:
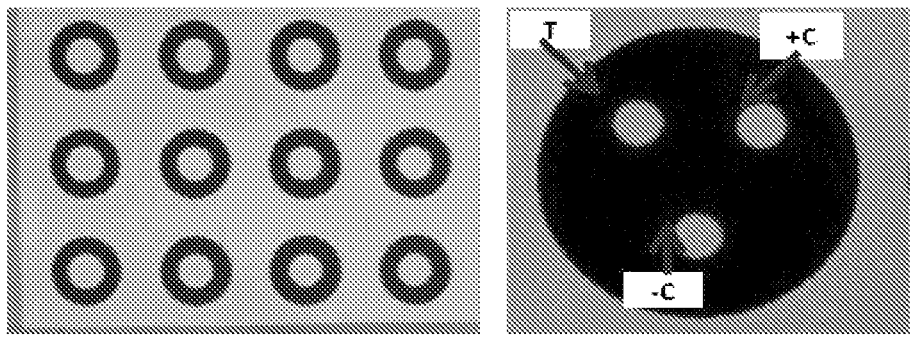
FIG. 4A depicts the paper used for standardization of ELISA.
FIG. 4B depicts a single layer paper device used for pregnancy test.
Figure 5:
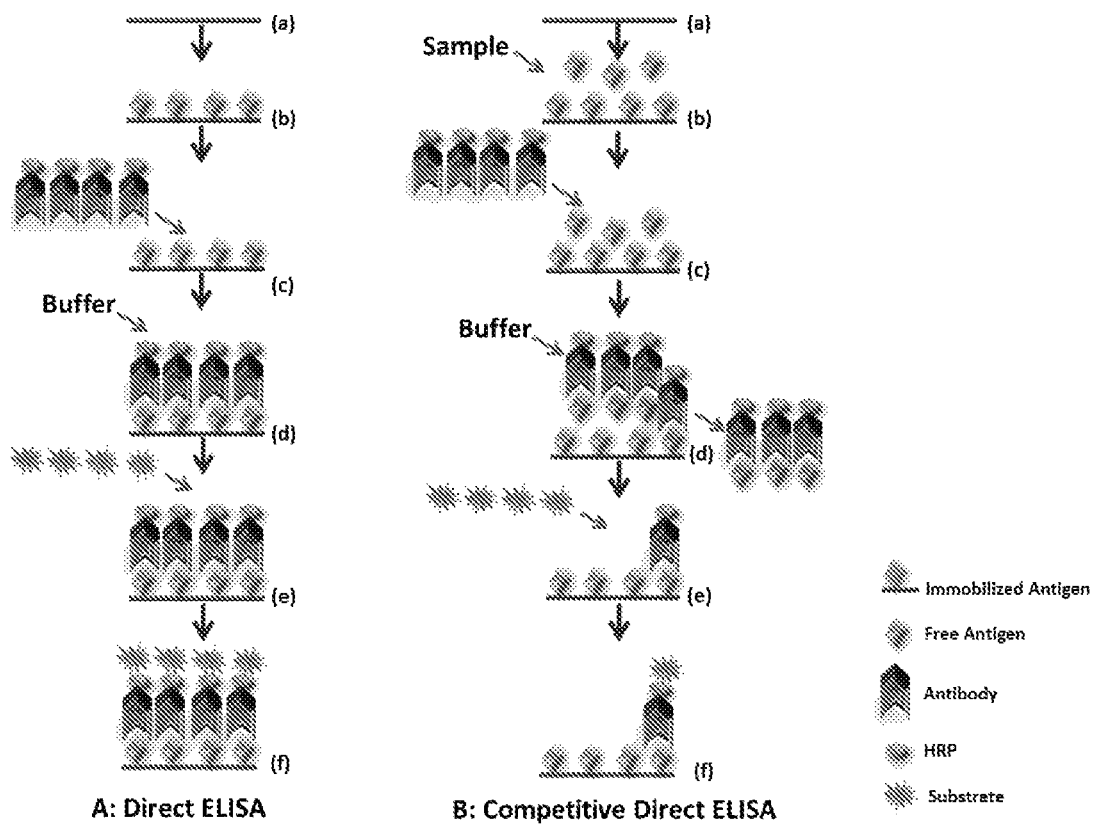
FIG. 5 depicts a schematic view of direct and competitive direct ELISA principles used in the device.

FIG. 4A shows the paper devices used for standardization of ELISA. A schematic representation of the immunoassay principle is shown in FIG. 5.

Optimization of Antibody Concentration

Extensive work was done for optimization of antibody concentration. The antibody concentration was optimized from 1:1 ratio down 1:51,200. It was found that 1:30,000 dilution works best for the paper-based device for identification of a threshold level of 5α antigen and other pregnane molecules, which are present at a concentration greater than 900 ng/g in pregnant animals.

Evaluation of Different Substrates

After extensive experimentation, it was identified that TMB substrate was most suitable for colorimetric determination in the present invention. The drawbacks of other substrates are briefly outlined as below:

TMB-Ultra sensitive: This substrate forms a soluble substrate which degrades rapidly.

TMB-Western Blot: It forms an insoluble and a stable product which is stable for longer time. However, this form of TMB is less sensitive and color development requires more time.

ABTS: This substrate forms a soluble substrate which degrades rapidly.

OPD: This substrate forms a soluble substrate which degrades rapidly.

DAB: This substrate forms a soluble substrate which degrades rapidly.

Paper-Based Single Layer Device

In an embodiment of the present invention, the paper-based single layer device design comprises three reaction zones, each having a diameter of 4 mm. The three reaction zones are the test zone, the positive control zone and the negative control zone. Except for the reaction zones, the entire surface of the device is layered by a hydrophobic material, preferably wax. The reaction zones are hydrophilic, which allows for the reaction between the reagents and the sample.

In another embodiment of the present invention, the paper-based single layer device design is printed on a 2.5 cm by 2.5 cm squared paper (100). Three reaction zones are created, each having a diameter of 4 mm. These three reaction zones are a test zone (101), a positive control zone (102) and a negative control zone (103). Except for the reaction zones, the entire surface of the device is layered by a hydrophobic material, preferably wax. The reaction zones are hydrophilic, which allows for the reaction between the reagents and the sample.

The paper-based single layer device encompasses the elements described in FIG. 1.

Paper-Based Multi-Layer Origami Device

In an embodiment of the present invention, the microfluidic device is a multi-layer device comprising a first layer configured for receiving biological sample and reagents, a second layer configured for delivery of biological sample and reagent to reaction zone, a third layer configured for delivery of biological sample to reaction zone, and a fourth layer configured for colorimetric detection of 5α-pregnan-3α-ol-20-one.

In another embodiment, the first layer (300) comprises of two input zones. The first input zone (301) having a diameter of 3 mm is for inputting the sample. The second input zone (302) having the diameter of 5 mm is for adding reagents to the device. Except for the input zones, entire surface of the first layer is layered by a hydrophobic material, preferably wax. The input zones are hydrophilic, which allows for the reagents and sample to percolate into the next layer through microfluidic capillary action.

In yet another embodiment, the second layer (400) comprises of an inverted y-shaped microfluidic channel (405) for delivery of reagents to the reaction zones in the fourth layer (600) via antibody-enzyme complex (AEC) storage zone in the third layer (500). The circular sample receiving zone (404) having diameter 3 mm in this section is for sample fluid to directly reach the antibody-enzyme complex storage zone. The size of all the circular sections connected to the fluidic channels is 4 mm Except for the microfluidic channel (405) and the circular zones (401, 402, 403 and 404), the entire surface of the first layer is layered by a hydrophobic material, preferably wax. The "Y"-shaped microfluidic channels (405) connected to the circular zones (402, 403 and 404) and the circular sample receiving zone (401) are hydrophilic, which allows for the reagents and sample to percolate into the next layer through microfluidic capillary action.

In yet another embodiment, the third layer (500) comprises the antibody-enzyme complex (AEC) storage zone. In this layer, there are three circular antibody-enzyme complex storage zones (502, 503 and 504) which are of 4 mm diameter each. The sample receiving port (501) is having a diameter of 3 mm One of the circular antibody-enzyme complex storage zone (502) is connected by a microfluidic channel to the sample receiving port (501), thus making it dumbbell-shaped structure. This dumbbell-shaped structure allows for the sample to travel to the antibody-enzyme complex storage zone (502), and consequently to the test zone (601) in the fourth layer. The circular zones (501, 502, 503 and 504) are deposed over the circular zones (401, 402, 403 and 404) in the second layer, which allows for the fluid in the second layer to percolate into the third layer.

In another embodiment, the fourth layer (600) comprises three biofunctionalized reaction zones. The three reaction zones have the diameter of 4 mm. The three reaction zones are the test zone (601), the positive control zone (602) and the negative control zone (603). Except for the reaction zones, the entire surface of the device is layered by a hydrophobic material, preferably wax. The reaction zones are hydrophilic, which allows for the reaction between the reagents and the sample.

The microfluidic device of the present invention enables rapid dearly detection of pregnancy in a more accessible and affordable manner to a huge population dependent on livestock rearing. The developed device is inexpensive and provides a rapid and objective determination of pregnancy within 4-6 weeks of pregnancy. Also, the device can be operated by semi-skilled as well as an unskilled common man. Consequently, the device will have a direct effect on increasing the total milk production, and the standard of living of small and marginal farmers.

EXAMPLES

The following examples particularly describe the manner in which the invention is to be performed. These examples are not intended to be inclusive of all aspects of the subject matter disclosed herein, but rather to illustrate representative methods and results. These examples are not intended to exclude equivalents and variations of the present invention which are apparent to one skilled in the art.

Example 1: Paper-Based Single Layer Device

A single-layered paper-based microfluidic kit for early detection of pregnancy in cattle and buffaloes was developed. The single layer device design was made using computer-aided design software. Particularly, CorelDRAW® (developed and marketed by Corel Corporation) was used for designing the single layer device. The device design is represented in FIG. 1. Thereafter, the design was printed on Whatmann® filter paper grade-4 (manufactured by GE Healthcare) using a solid ink wax printer (Xerox ColorQube 8570N).

As described in FIG. 1, the design was printed on a 2.5 cm by 2.5 cm squared paper (100). Three reaction zones were created, each having the diameter of 4 mm. These three reaction zones are a test zone (101), a positive control zone (102) and a negative control zone (103). Except for these three reaction zones, the entire surface of the device was layered by a hydrophobic material, preferably wax. The reaction zones are hydrophilic, which allows for reaction between reagents and a sample.

Once the wax was patterned, the paper substrate was heated by placing the substrate on a hot plate with the wax side up at a temperature of 120° C. for two minutes and cooled to room temperature. This allowed the wax material to melt and percolate vertically (down) to the other side of the paper. Further, melted wax also wicked in the horizontal axis of the paper creating a broader line of the paper, so as to form a hydrophobic boundary that defines the dimensions of the reaction zones.

For biofunctionalization of the single layer device, the reaction zones were treated with 0.5% low molecular weight chitosan solution. The device was either dipped in a chitosan bath or 3 µl chitosan was added to the reaction zones. Once the reaction zones were semi-dried (approximately after 5 min), the reaction zones were treated with 0.5% glutaraldehyde solution, either by dipping in a glutaraldehyde bath or adding 3 µl glutaraldehyde to the reaction zones. The device was then dried at room temperature for approximately one hour.

After complete drying, 3 µl Bovine Serum Albumin (BSA)-conjugated 5α antigen was immobilized on the test zone (101) and the positive control zone (102). Thereafter, the blocking step was performed by treating all three zones with 5 µl blocking buffer (0.1M PBS with 5% BSA). The antibody concentration of 1:30000 dilution was used to identify the threshold level of 5α antigen found in cattle fecal sample. The single-layered device can be used for detection of 5α antigen in a fecal sample of cattle and buffaloes.

Example 2: Paper-Based Multi-Layer Device

A multi-layered paper-based microfluidic kit for early detection of pregnancy in cattle and buffaloes was developed. The multi-layer device contains four layers. The layer design was made using computer-aided design software. Particularly, CorelDRAW® (developed and marketed by Corel Corporation) was used for designing the single layer device. The device design is represented in FIG. 2. Each layer was printed on Whatmann® filter paper grade-4 (manufactured by GE Healthcare) using a solid ink wax printer (Xerox ColorQube 8570N).

As described in FIG. 2, the design was printed on a 10 cm by 2.5 cm paper (200) and it was folded into four squared pieces of 2.5 cm by 2.5 cm each, which represents one layer of the paper-based device.

First Layer

The first layer (300) comprises of two input zones. The first input zone (301) having the diameter of 3 mm is for inputting the sample. The second input zone (302) having the diameter of 5 mm is for adding reagents to the device. Except for the input zones, the entire surface of the first layer was layered by a hydrophobic material, preferably wax. The input zones are hydrophilic, which allows for the reagents and sample to percolate into the next layer through microfluidic capillary action.

Second Layer

The second layer (400) comprises of an inverted y-shaped microfluidic channel (405) for delivery of reagents to the reaction zones in the fourth layer (600) via antibody-enzyme complex (AEC) storage zone in the third layer (500). The circular sample receiving zone (404) having diameter 3 mm in this section is for sample fluid to directly reach the antibody-enzyme complex storage zone. The size of all the circular sections connected to the fluidic channels is 4 mm in diameter. Except for the microfluidic channel (405) and the circular zones (401, 402, 403 and 404), the entire surface of the second layer was layered by a hydrophobic material, preferably wax. The "Y"-shaped microfluidic channels (405) connected to the circular zones (402, 403 and 404) and the circular sample receiving zone (401) are hydrophilic, which allows for the reagents and sample to percolate into the next layer through microfluidic capillary action. All the circular inputs are connected through the fluidic channels of the size of 1 mm width and 6 mm length.

Third Layer

The third layer (500) comprises an antibody-enzyme complex (AEC) storage zone. In this layer, there are three circular antibody-enzyme complex storage zones (502, 503 and 504) which are of 4 mm diameter each. The sample receiving port (501) is having a diameter of 3 mm One of the circular antibody-enzyme complex storage zone (502) is connected by a microfluidic channel to the sample receiving port (501), thus making it dumbbell-shaped structure. The microfluidic channel is 1 mm width and 4 mm in length. This dumbbell-shaped structure allows for the sample to travel to the antibody-enzyme complex storage zone (502), and consequently to the test zone (601) in the fourth layer. The circular zones (501, 502, 503 and 504) are deposed over the circular zones (401, 402, 403 and 404) in the second layer, which allows for the fluid in the second layer to percolate into the third layer.

Fourth Layer

The fourth layer (600) comprises three biofunctionalized reaction zones. These three reaction zones have a diameter of 4 mm. These three reaction zones are a test zone (601), a positive control zone (602) and a negative control zone (603). Except for the reaction zones, the entire surface of the fourth layer was layered by a hydrophobic material, preferably wax. These reaction zones are hydrophilic, which allows for the reaction between the reagents and the sample.

For biofunctionalization of the fourth layer, the reaction zones were treated with 0.5% low molecular weight chitosan solution. The layer was either dipped in a chitosan bath or 3 µl chitosan was added to the reaction zones. Once the reaction zones were semi-dried (approximately after 5 min), the reaction zones were treated with 0.5% glutaraldehyde solution, either by dipping in a glutaraldehyde bath or adding 3 µl glutaraldehyde to the reaction zones. The device was then dried at room temperature for approximately one hour. After complete drying, 3 µl Bovine Serum Albumin (BSA)-conjugated 5α antigen was immobilized on the test zone (601) and the positive control zone (602). Thereafter, the blocking step was performed by treating all three zones with 5 µl blocking buffer.

The antibody concentration of 1:30000 dilution was used to identify the threshold level of 5α antigen found in a cattle fecal sample. All the samples, reagents and antibody-enzyme complex passed through all the paper fiber and eventually reached the final layer reaction. The devices were printed on a single paper and then folded in origami folds to prepare the final devices.

Figure 6:
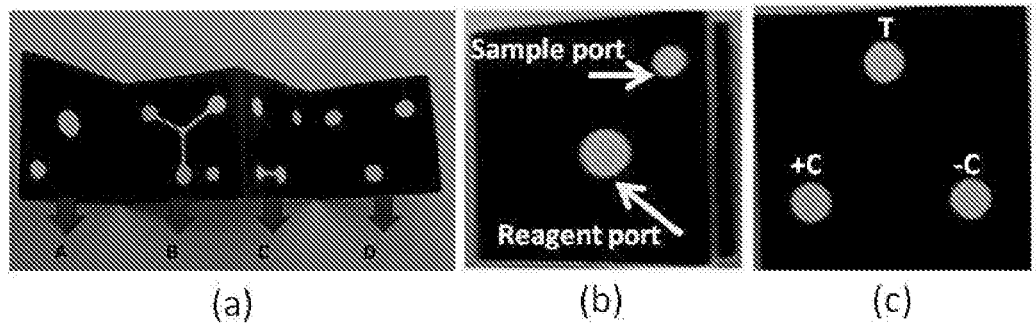
FIG. 6(a) depicts the multi-layer devices which were printed on a single paper and then folded in origami folds.
FIG. 6(b) depicts the sample port and reagent port of the first layer of the multi-layer device.
FIG. 6(c) depicts the test zone, positive control zone and negative control zone of the fourth layer of the multi-layer device.
Figure 7A:
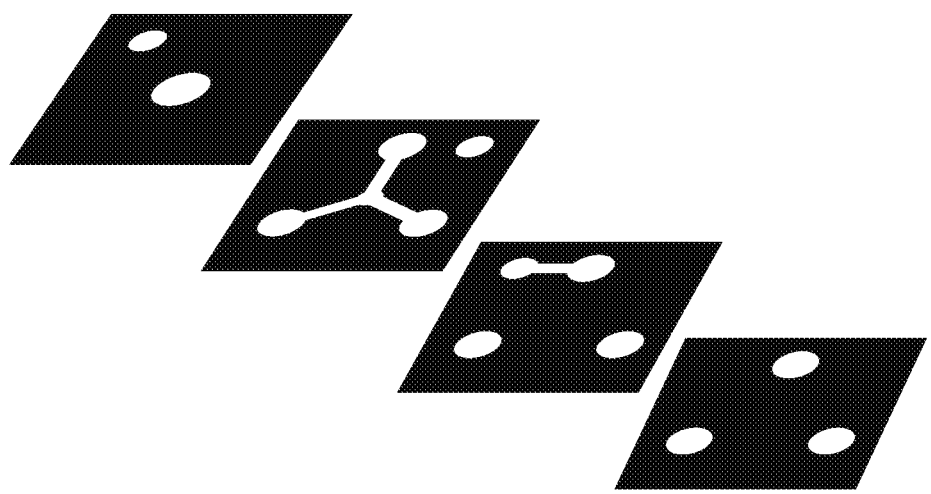
FIGS. 7A and 7B depicts the layers of the multi-layer device separately.
Figure 7B:
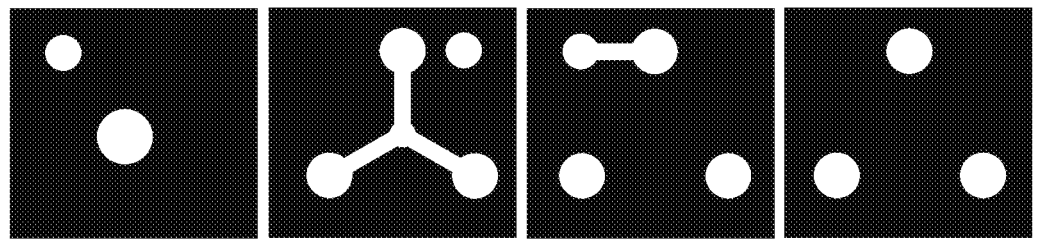

FIG. 6(a) depicts the multi-layer device which was printed on a single paper and then folded in origami folds. FIG. 6(b) depicts the sample port and reagent port of the first layer of the multi-layer device. FIG. 6(c) depicts the test zone, positive control zone and negative control zone of the fourth layer of the multi-layer device. FIGS. 7A and 7B depict the layers of the multi-layer device, separately.

Example 3: Extraction of Antigen from the Fecal Sample

The 5α-pregnan-3α-ol-20-one antigen in a fecal sample of cattle and buffaloes is a metabolite which determines whether the cattle is pregnant or not. For extracting the threshold level of said antigen, a novel approach using 10 mM (2-Hydroxypropyl)-β-cyclodextrin (2HPβCD) was employed.

The approach is characterized by a one-step process involving only one reagent for extraction of 5α antigen. For extracting the antigen, 0.2 g of the fecal sample was taken in a vial and 3 ml of 10 mM 2HPβCD solution was added. The vial was moderately shaken for 2 minutes and then allowed to stand until a clear supernatant was visible. This sample supernatant contains the threshold amount of antigen for determining the pregnancy in cattle or buffaloes. This one-step process using only one chemical can be practiced by even an unskilled person in rural areas.

Example 4: Operation of Paper-Based Single Layer Device

Figure 8:
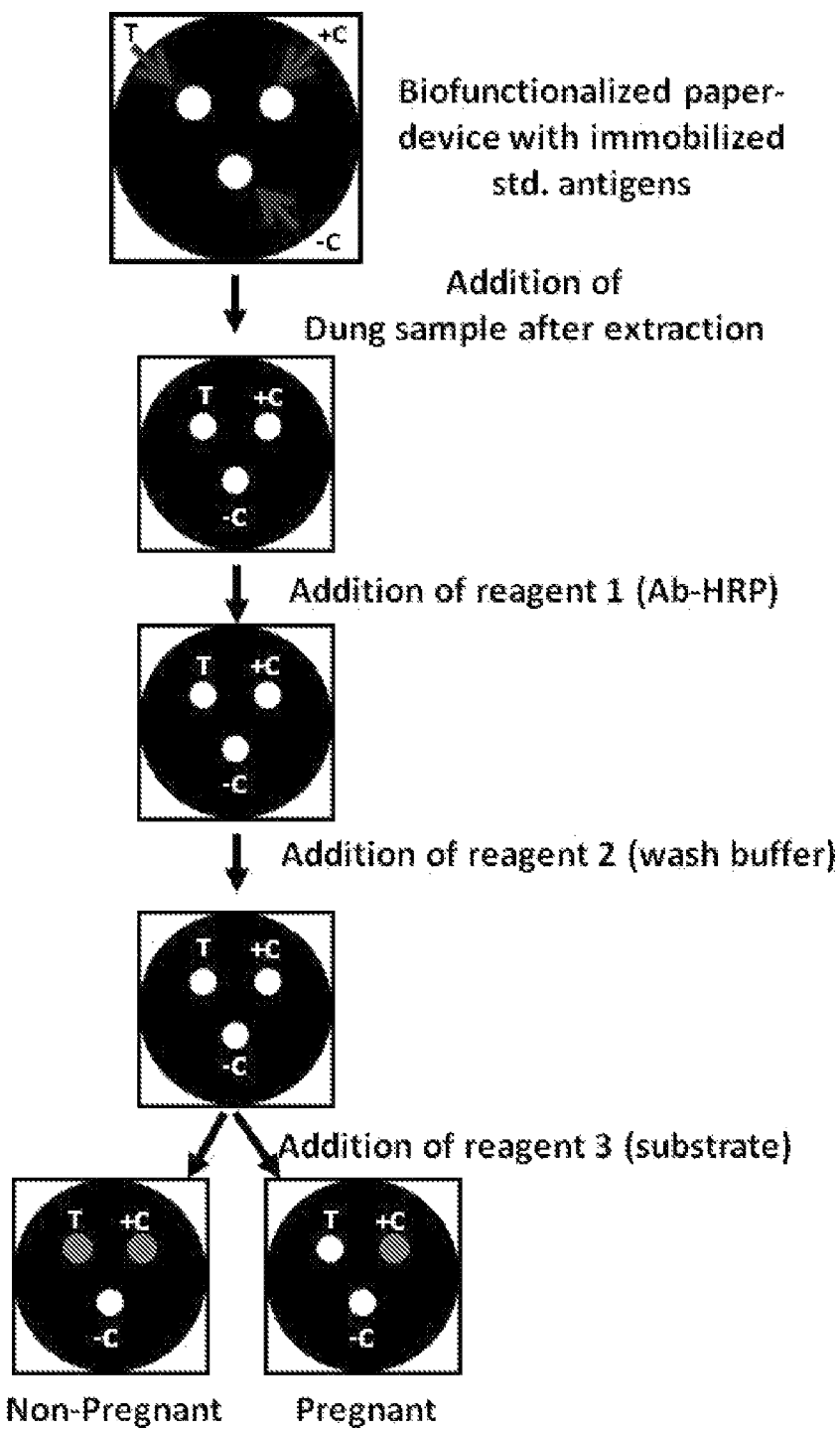
FIG. 8 is a schematic view of the working of the single layer device.
Figure 9:
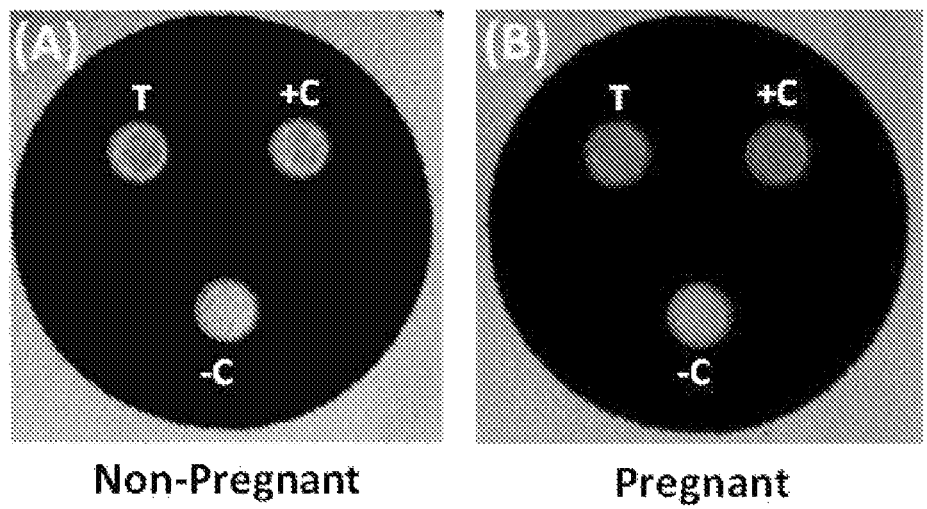
FIG. 9 depicts positive and negative test results obtained with the single layer device.

The paper-based single layer device was used to determine whether the fecal sample of the cattle or buffalo contains the threshold amount of 5α antigen, which will determine whether the cattle or buffalo is pregnant or not. A schematic view of the operation of a single layer device is provided in FIG. 8.

The paper-based single layer device (100) as shown in FIG. 1 is used. 3 µl of sample supernatant extracted in example 3 was added on to the test zone (101). 3 µl of antibody-enzyme complex solution (reagent 1) was added to all the three zones: the test zone (101), the positive control zone (102) and the negative control zone (103). The antibody-enzyme complex is 5α-pregnan-3α-ol-20-one antibody conjugated with horseradish peroxidase (HRP). Thereafter, 10 µl of wash buffer (reagent 2) was added to all the three zones of the device. The wash buffer consists of (0.15 M NaCl, 0.05% Tween 20). A blotting paper pad was kept underneath the paper devices to absorb the wash-out. Finally, 3 µl of 3,3',5,5'-Tetramethylbenzidine (TMB) (substrate; reagent 3) was added to the three zones of the device.

The results appeared as blue color on the device as shown in 9. If color appears in both test zone and the control zone, then it is determined that the sample is from a non-pregnant animal. If color appears only in positive control zone with no color or faint color in the test zone, it indicates that said sample is from a pregnant animal. The color of the test zone can further be correlated to the instructions manual provided with the device in order to confirm the pregnancy status of the cattle or buffalo.

Example 5: Operation of Paper-Based Multilayer Device

The paper-based multi-layer device was used to determine whether the fecal sample of the cattle or buffalo contained the threshold amount of 5α antigen, which will determine whether the cattle or buffalo is pregnant or not.

The multi-layered device (200) as shown in FIG. 2 was used. 3 µl of sample supernatant extracted in example 3 was added on to the sample port of the device (301). 20 µl of wash buffer (reagent 1) was added to the reagent port of the device (302). Further, 3 µl of Substrate (TMB; reagent 2) was added the reagent port of the device (302).

Figure 10:
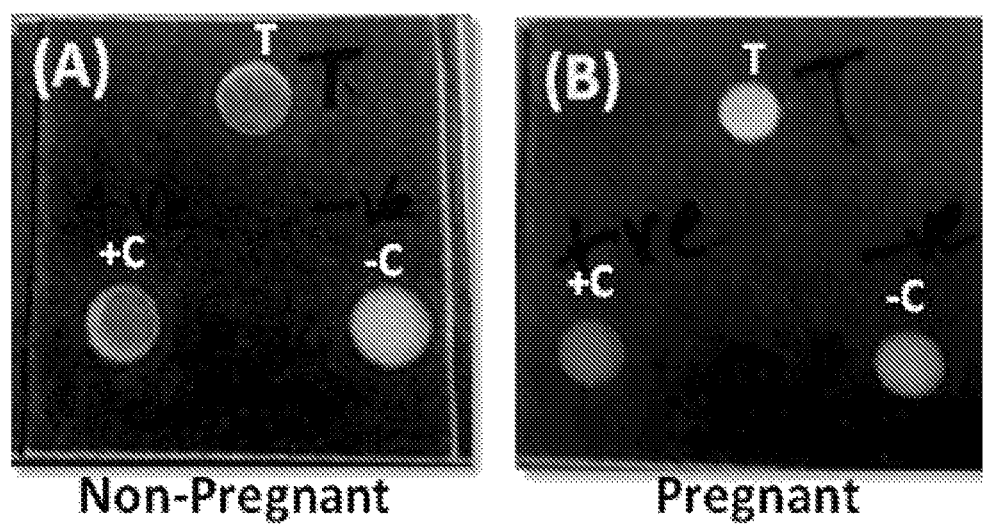
FIG. 10 depicts the positive and negative test results obtained with the multi-layer device.

The results appeared as a blue color on the device as shown in FIG. 10. If the color appears in both test zone and the control zone, it is determined that the sample is from a non-pregnant animal. If the color appears only in the positive control zone, with no color or faint color in the test zone, it indicates that the sample is from a pregnant animal. The color of the test zone can further be correlated to the instructions manual provided with the device in order to confirm the pregnancy status of the cattle or buffalo.

Table 2 as below provides the total numbers of the tests conducted for the single layer devices and multi-layer microfluidic devices of the present invention along with the results obtained.

TABLE 2

| | Single-layer Devices | | | | Multi-layer Devices | | | |
|---|---|---|---|---|---|---|---|---|
| Samples | Total Devices | Positive | Negative | % Accuracy | Total Devices | Positive | Negative | % Accuracy |
| Laboratory Standards | 120* | 109 | 11 | 90.83% | 125* | 115 | 10 | 92% |
| Pregnant Samples | 140* | 119 | 21 | 85% | 135* | 106 | 22 | 78.5% |
| Non-Pregnant Samples | 135* | 13 | 122 | 90% | 130* | 08 | 122 | 90.4% |

*results indicating during the course of development in various stages

The results confirm the very high accuracy of the microfluidic device of the present invention for use in early detection of pregnancy in cattle and buffalo.

For detection of pregnancy using other non-invasive procedures such as urine sample, there are several disadvantages. Firstly, the collection of urine is difficult as it needs to be timed Further, the collection of urine from cattle or buffalo is tricky as a close watch on animal is required. Also, in case of aggressive cattle, it is even more difficult to go nearby and collect the urine sample. Moreover, the hormone concentration varies widely across the day as hormone secretion fluctuates, thus leading to erratic actual value. Furthermore, as the concentration of the hormone in urine is comparatively low, the assay requires highly sensitive method direction requiring more amount of antibodies and detection reagent, which can increase the cost.

There are several advantages of the microfluidic device of the present invention which uses dung sample for early detection of pregnancy as compared to other non-invasive procedures using urine sample. Collection of dung sample is rather less time consuming than collection of a urine sample and a close watch on the animal is not required. Sample collection is a much easier, anybody can collect dung samples at any point of time without farmer's help. No skill is required. Further, the dung sample provides overall average hormone concentration of the previous day, therefore, there is no scope of intraday variation. Also, since the hormone metabolite is accumulation of whole day, the concentration of hormone and hormone derivatives is much higher thereby sensitivity is not compromised.

Advantages of the Invention

The present invention uses dung samples for detecting pregnancy, which is a non-invasive procedure and the results are obtained within one month of pregnancy in cattle and buffalo.

It is an affordable paper-based device, which is easy to use for on-site detection in rural areas.

No skilled person is required to test or use the device.

The kit is affordable and can be stored at room temperature.

The device is helpful to dairy farmers to detect pregnancy at an early stage and plan for pregnancy management and artificial insemination as needed, which shall lead to both improved reproductivity outcome and increased milk production resulting in economic benefit to the farmers.

Early detection of pregnancy will have strong socio-economic impact on farmers and dairy industry.

The developed device is easily disposable and therefore, environmentally green.

We claim:

1. A microfluidic device comprising:
   a first layer comprising:
      a first hydrophilic material layer,
      a first hydrophobic material layer disposed on a surface of the first hydrophilic material layer,
      a sample port for receiving a biological sample, and
      a reagent port for receiving a reagent;
   a second layer adjacent the first layer and comprising:
      a second hydrophilic material layer,
      a second hydrophobic material layer disposed on a surface of the second layer,
      a first circular zone for receiving the biological sample from the sample port and delivering the biological sample one or more antibody-enzyme complex storage zones, and
      a second circular zone for receiving the reagent from the reagent port and delivering the reagent to the one or more antibody-enzyme complex storage zones,
      where the second hydrophobic material layer is configured to face the first layer and the first hydrophobic material layer is configured to face away from the second layer;
   a third layer adjacent the second layer and comprising:
      a third hydrophilic material,
      a third hydrophobic material layer disposed on a surface of the third layer, and
      one or more antibody-enzyme complex storage zones,
      wherein the third hydrophobic material layer is configured to face the second layer; and
   a fourth layer adjacent the third layer and comprising:
      a fourth hydrophilic material layer,
      a fourth hydrophobic material layer disposed on a surface of the fourth layer, and
      a test zone configured for fluidic communication with the one or more antibody-enzyme complex storage zones and comprising immobilized 5α-pregnan-3α-ol-20-one antigen for colorimetric detection of 5α-pregnan-3α-ol-20-one,
      where the fourth hydrophobic material layer is configured to face the third layer,
   wherein the second layer further comprises an inverted y-shaped microfluidic channel for receiving reagent from the reagent port at a center portion of the y-shaped microfluidic channel and delivering the reagent to the second circular zone, a third circular zone, and a fourth circular zone, where the second circular zone is configured to deliver the reagent to the one or more antibody-enzyme complex storage zones, where the third circular zone configured to deliver the reagent to a positive control zone of the fourth layer, and where the fourth circular zone is configured to deliver the reagent to a negative control zone of the fourth layer.

2. The microfluidic device as claimed in claim 1, wherein the third layer comprises:
   a first circular zone for delivery of the biological sample to the antibody-enzyme complex storage zone;
   a second circular zone for delivery of the reagent to a positive control zone of the fourth layer; and
   a third circular zone for delivery of the reagent to a negative control zone of the fourth layer.

3. The microfluidic device as claimed in claim 1, wherein the fourth layer further comprises:
   a positive control zone comprising immobilized 5α-pregnan-3α-ol-20-one antigen for generating a positive control signal to confirm transfer of at least part of the reagent from the sample port to the test zone; and
   a negative control zone, for generating a negative control to confirm transfer of at least part of the reagent from the sample port to the test zone.

4. The microfluidic device as claimed in claim 1, wherein the first layer has a thickness of less than 220 μm and particle retention of more than 10 μm.

5. A method for colorimetric detection of 5α-pregnan-3α-ol-20-one in a biological sample using the device as claimed in claim 1, the method comprising:
   a. adding a biological sample to the sample port;
   b. adding a wash buffer to the reagent port;
   c. adding 3,3',5,5'-tetramethylbenzidine substrate to the reagent port; and
   d. detecting the color of the test zone,
   wherein appearance of a faint color or no color in the test zone confirms the presence of 5α-pregnan-3α-ol-20-one in the biological sample.

6. The method as claimed in claim 5, wherein the biological sample is obtained from dung of cattle or buffalo.

7. A kit for early detection of pregnancy in cattle and buffalo comprising:
   I. a microfluidic device as claimed in claim 1;
   II. at least three reagents;
   III. a vial; and
   IV. an instruction manual.

8. The kit as claimed in claim 7, wherein the at least three reagents comprise a wash buffer, 3,3',5,5'-tetramethylbenzidine substrate and 2-hydroxypropyl cyclodextrin.

9. The kit as claimed in claim 8, wherein the at least three reagents further comprises an antibody-enzyme complex solution.

10. The microfluidic device as claimed in claim 1, wherein
    the first layer, the second layer, the third layer and the fourth layer are connected in series and linearly in the form of a sheet with the first layer and the fourth layer at ends of the sheet; and
    the linear sheet is foldable into a vertical stack to form the microfluidic device, the vertical stack in the order of the first layer, the second layer, the third layer and the fourth layer with the first layer and the fourth layer at ends of the vertical stack.

11. The kit of claim 7, wherein
    the first layer, the second layer, the third layer and the fourth layer of the microfluidic device are connected in series and linearly in the form of a sheet with the first layer and the fourth layer at ends of the sheet; and
    the linear sheet is foldable into a vertical stack to form the microfluidic device, the vertical stack in the order of the first layer, the second layer, the third layer and the fourth layer with the first layer and the fourth layer at ends of the vertical stack.

12. A microfluidic device comprising:
    a first layer comprising:
      a first hydrophilic material layer,
      a first hydrophobic material layer disposed on a surface of the first hydrophilic material layer,
      a sample port for receiving a biological sample, and
      a reagent port for receiving a reagent;
    a second layer adjacent the first layer and comprising:
      a second hydrophilic material layer,
      a second hydrophobic material layer disposed on a surface of the second layer,
      a first circular zone for receiving the biological sample from the sample port and delivering the biological sample one or more antibody-enzyme complex storage zones, and
      a second circular zone for receiving the reagent from the reagent port and delivering the reagent to the one or more antibody-enzyme complex storage zones,
      where the second hydrophobic material layer is configured to face the first layer and the first hydrophobic material layer is configured to face away from the second layer;
    a third layer adjacent the second layer and comprising:
      a third hydrophilic material,
      a third hydrophobic material layer disposed on a surface of the third layer, and
      the one or more antibody-enzyme complex storage zones,
      wherein the third hydrophobic material layer is configured to face the second layer; and
    a fourth layer adjacent the third layer and comprising:
      a fourth hydrophilic material layer,
      a fourth hydrophobic material layer disposed on a surface of the fourth layer, and
      a test zone configured for fluidic communication with the one or more antibody-enzyme complex storage zones and comprising immobilized 5α-pregnan-3α-ol-20-one antigen for colorimetric detection of 5α-pregnan-3α-ol-20-one,
      where the fourth hydrophobic material layer is configured to face the third layer,
    wherein
      the first layer, the second layer, the third layer and the fourth layer are connected in series and linearly in the form of a sheet with the first layer and the fourth layer at ends of the sheet; and
      the linear sheet is foldable into a vertical stack to form the microfluidic device, the vertical stack in the order of the first layer, the second layer, the third layer and the fourth layer with the first layer and the fourth layer at ends of the vertical stack.

* * * * *